(12) United States Patent
Nakamura

(10) Patent No.: US 10,893,180 B2
(45) Date of Patent: Jan. 12, 2021

(54) IMAGING DEVICE

(71) Applicant: NIDEC COPAL CORPORATION, Tokyo (JP)

(72) Inventor: Yuta Nakamura, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 16/480,233

(22) PCT Filed: Jan. 16, 2018

(86) PCT No.: PCT/JP2018/000899
§ 371 (c)(1),
(2) Date: Jul. 23, 2019

(87) PCT Pub. No.: WO2018/135453
PCT Pub. Date: Jul. 26, 2018

(65) Prior Publication Data
US 2020/0007725 A1    Jan. 2, 2020

(30) Foreign Application Priority Data

Jan. 23, 2017  (JP) .................................. 2017-009480

(51) Int. Cl.
*H04N 5/225* (2006.01)
*G02B 7/02* (2006.01)

(52) U.S. Cl.
CPC ............. *H04N 5/2254* (2013.01); *G02B 7/02* (2013.01)

(58) Field of Classification Search
CPC .................................................... H04N 5/2254
USPC ......................................................... 348/374
See application file for complete search history.

(56) References Cited

U.S. PATENT DOCUMENTS

2006/0092311 A1*  5/2006  Hartlove .................. G02B 7/08
                                                              348/340
2019/0166289 A1*  5/2019  Knutsson ............. H04N 5/2254

FOREIGN PATENT DOCUMENTS

| JP | 6-23375 U | 3/1994 |
|---|---|---|
| JP | 10-28233 A | 1/1998 |
| JP | 2005-55757 A | 3/2005 |
| JP | 2007-19813 A | 1/2007 |
| JP | 2012-74934 A | 4/2012 |
| JP | 2012-113185 A | 6/2012 |

OTHER PUBLICATIONS

International Search Report issued in International Patent Application No. PCT/JP2018/000899 dated Apr. 24, 2018.

* cited by examiner

*Primary Examiner* — Joel W Fosselman
(74) *Attorney, Agent, or Firm* — Troutman Pepper Hamilton Sanders LLP

(57) ABSTRACT

An imaging device having a substrate having an imaging unit mounted thereupon; a lens barrel holding a lens; a holder holding the lens barrel and being connected to the substrate; and a first elastic body impelling the substrate in a first direction perpendicular to the optical axis.

6 Claims, 8 Drawing Sheets

[FIG. 1]
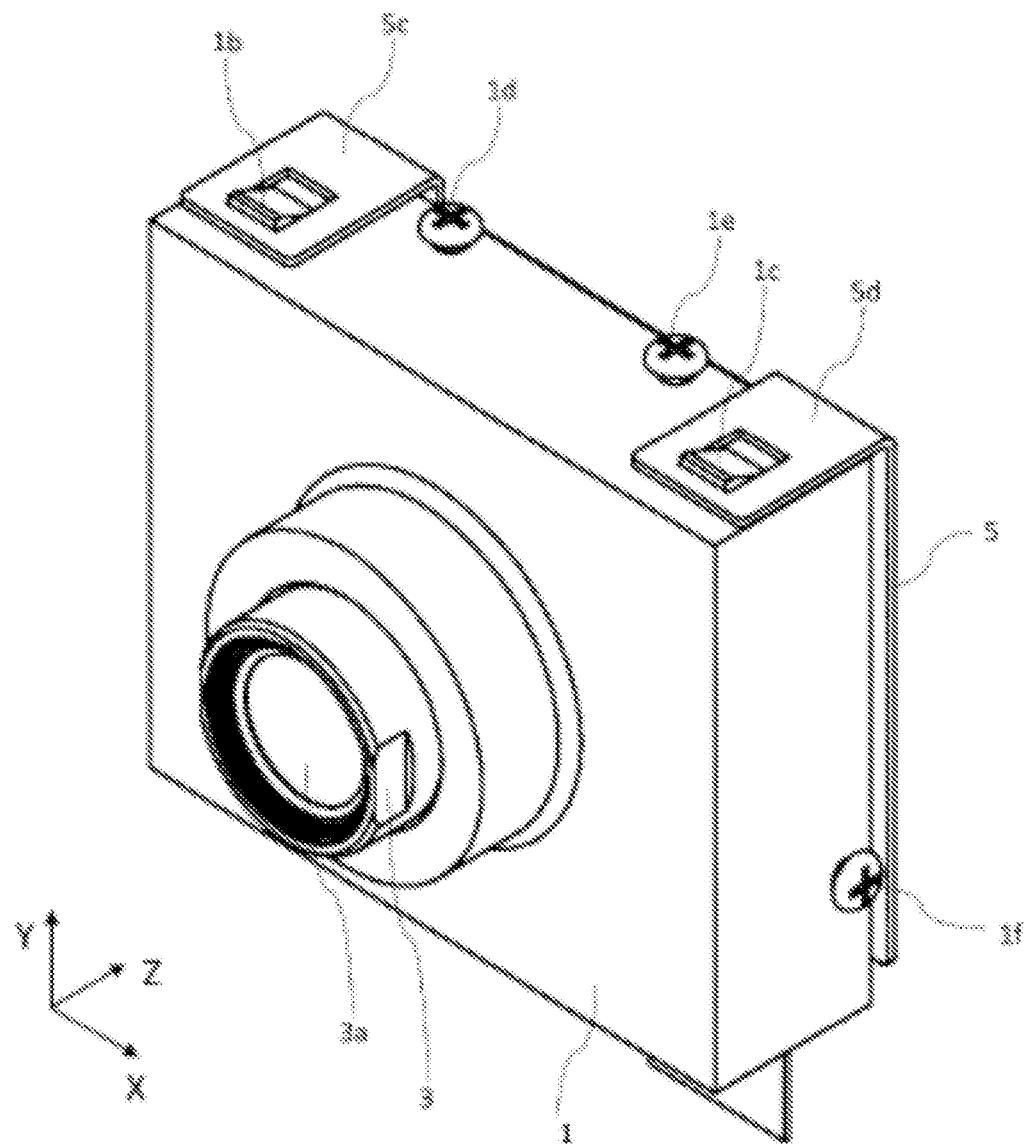

[FIG. 2]
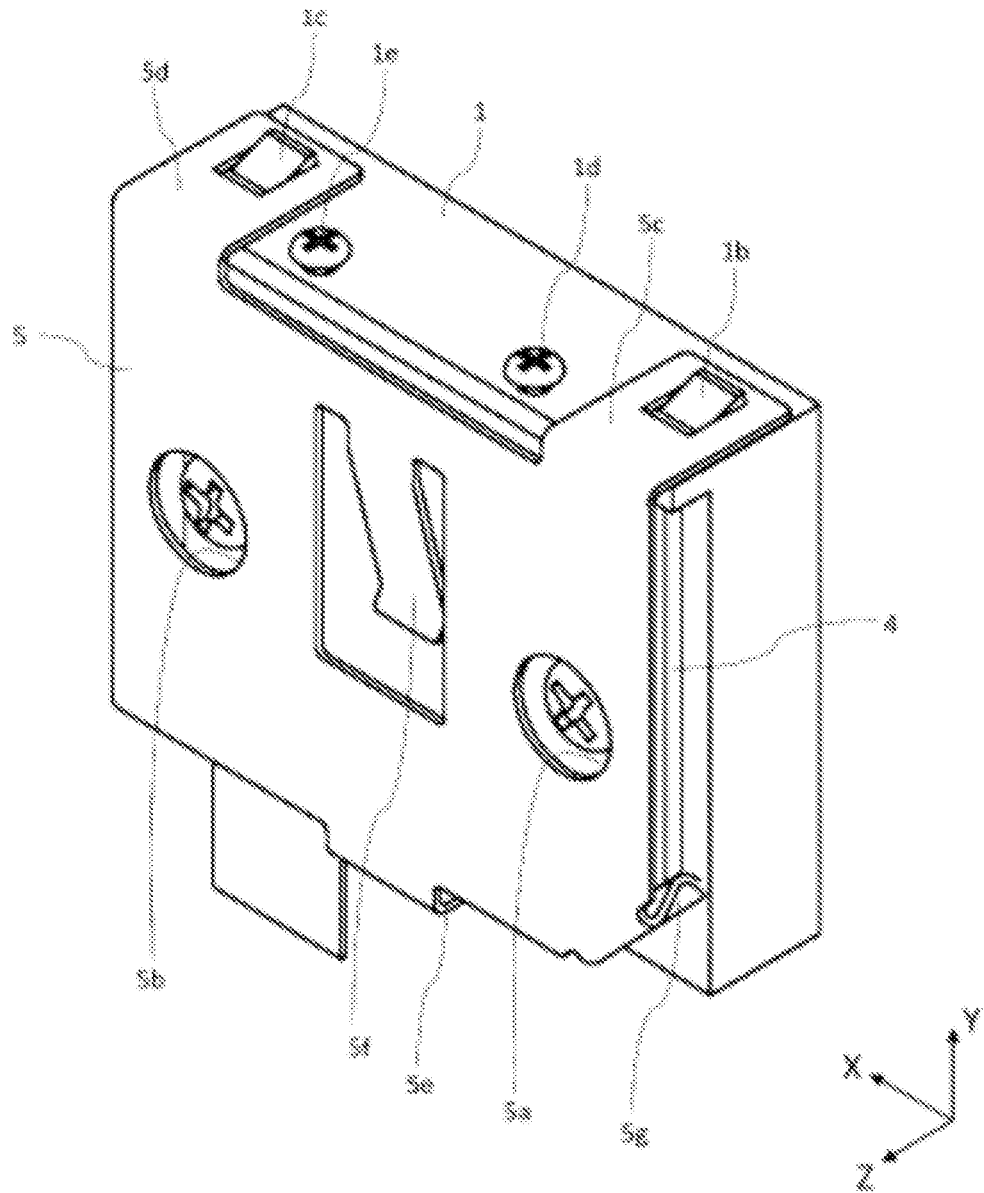

[FIG. 3]
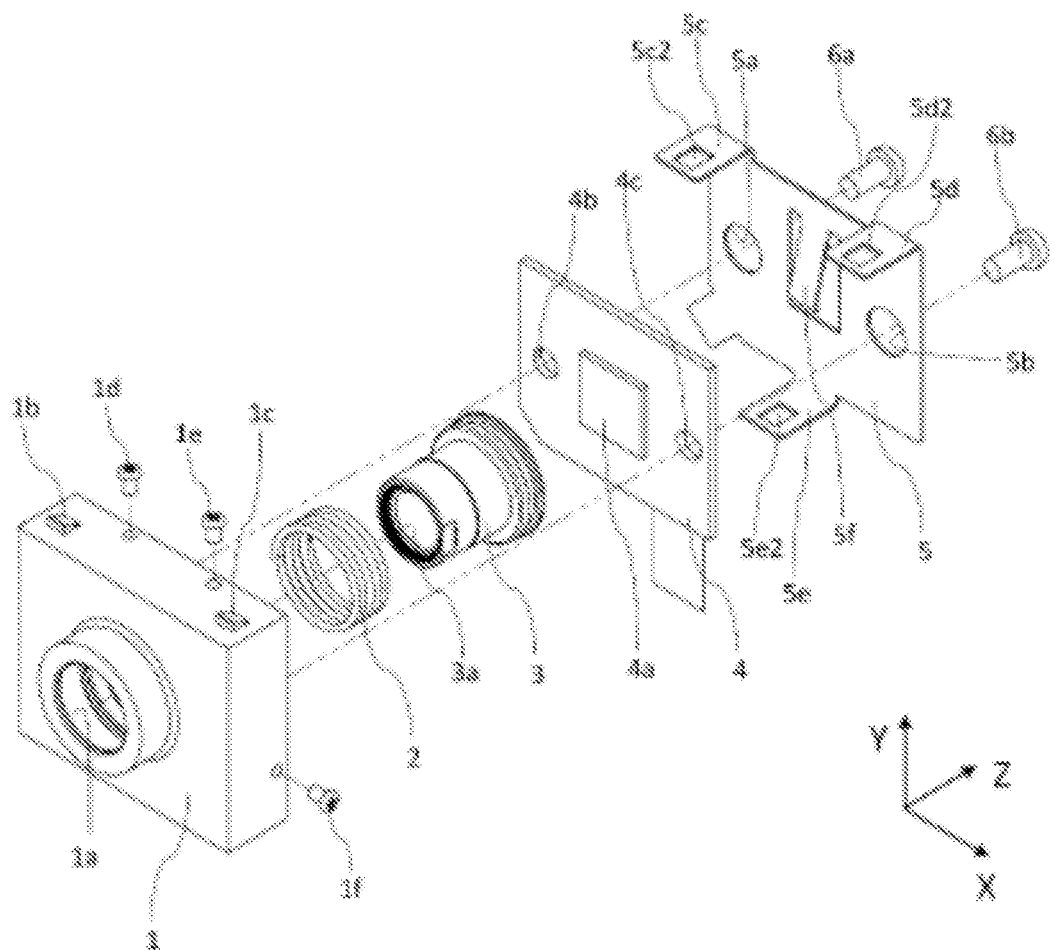

[FIG. 4]
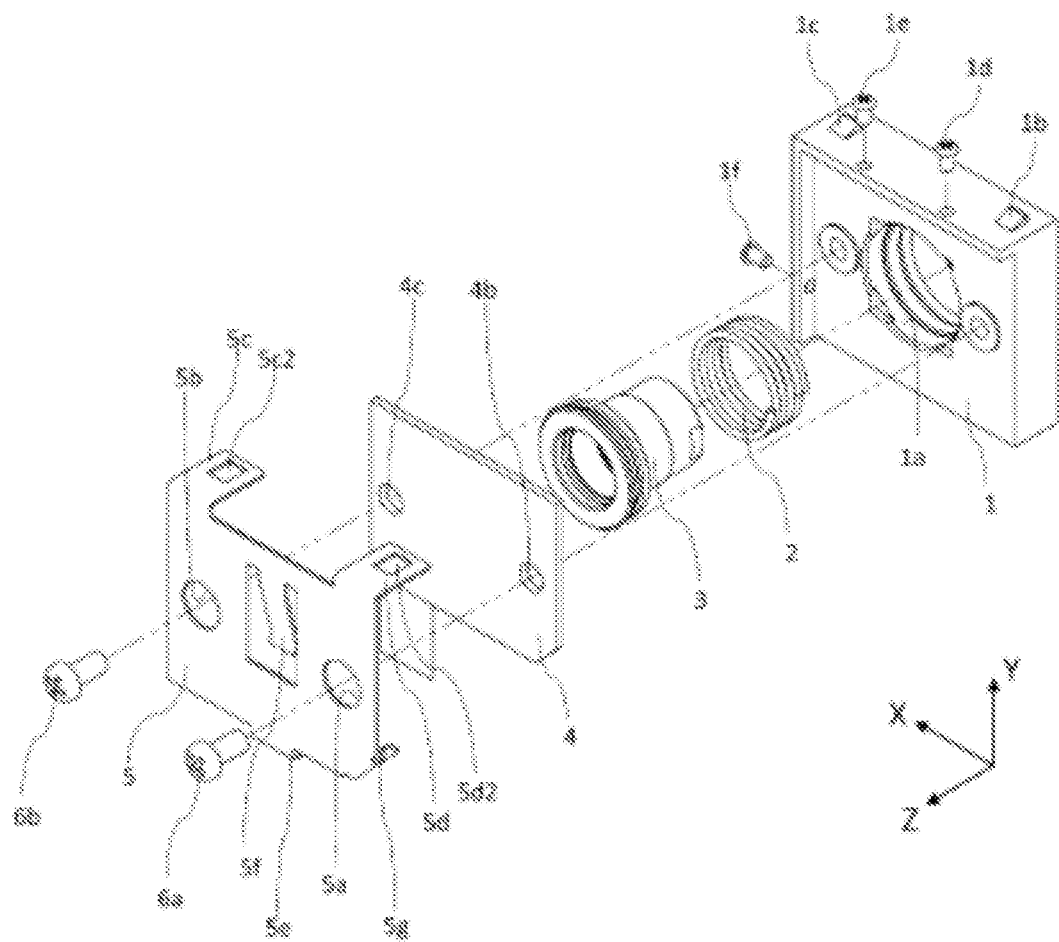

[FIG. 5]
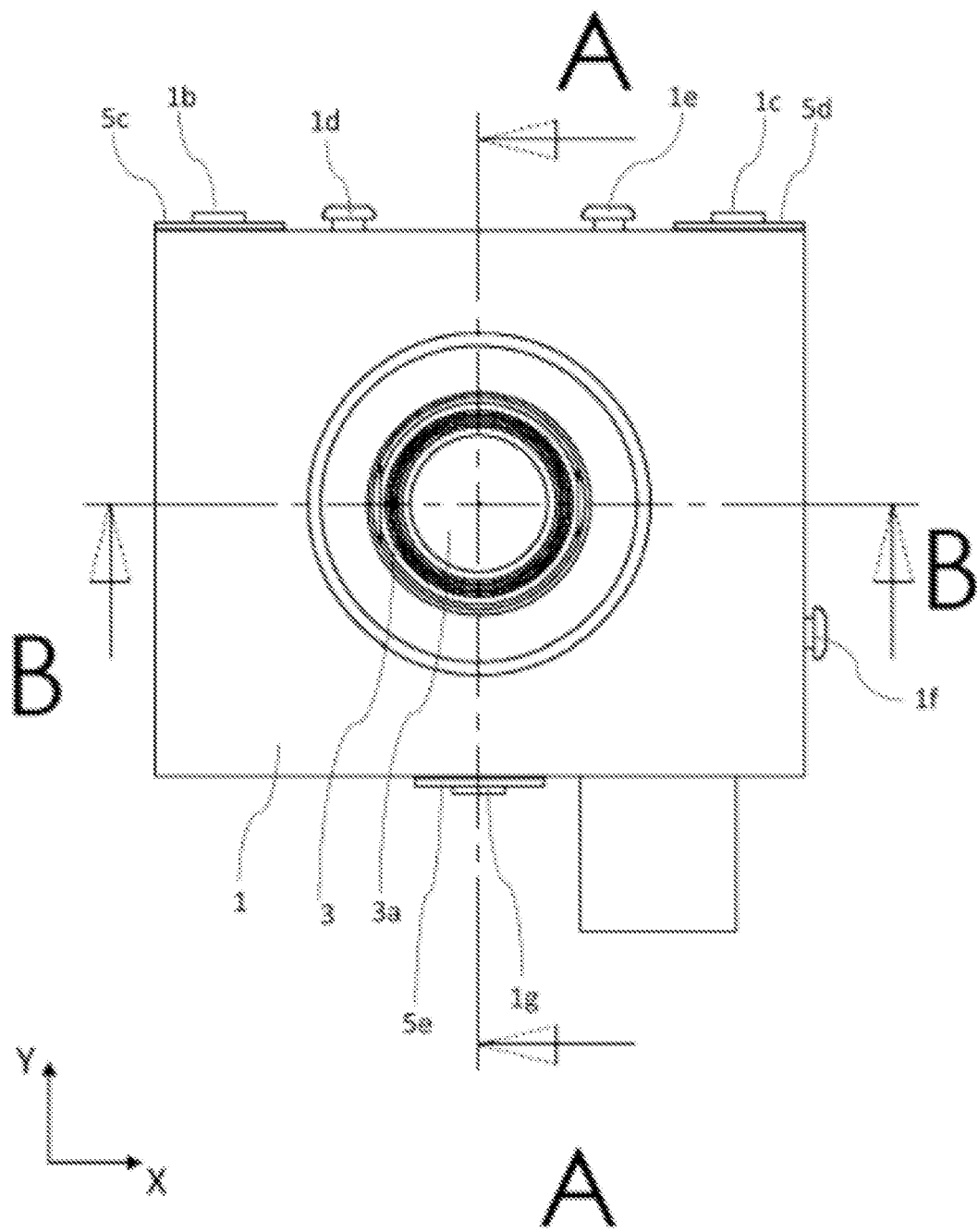

[FIG. 6]
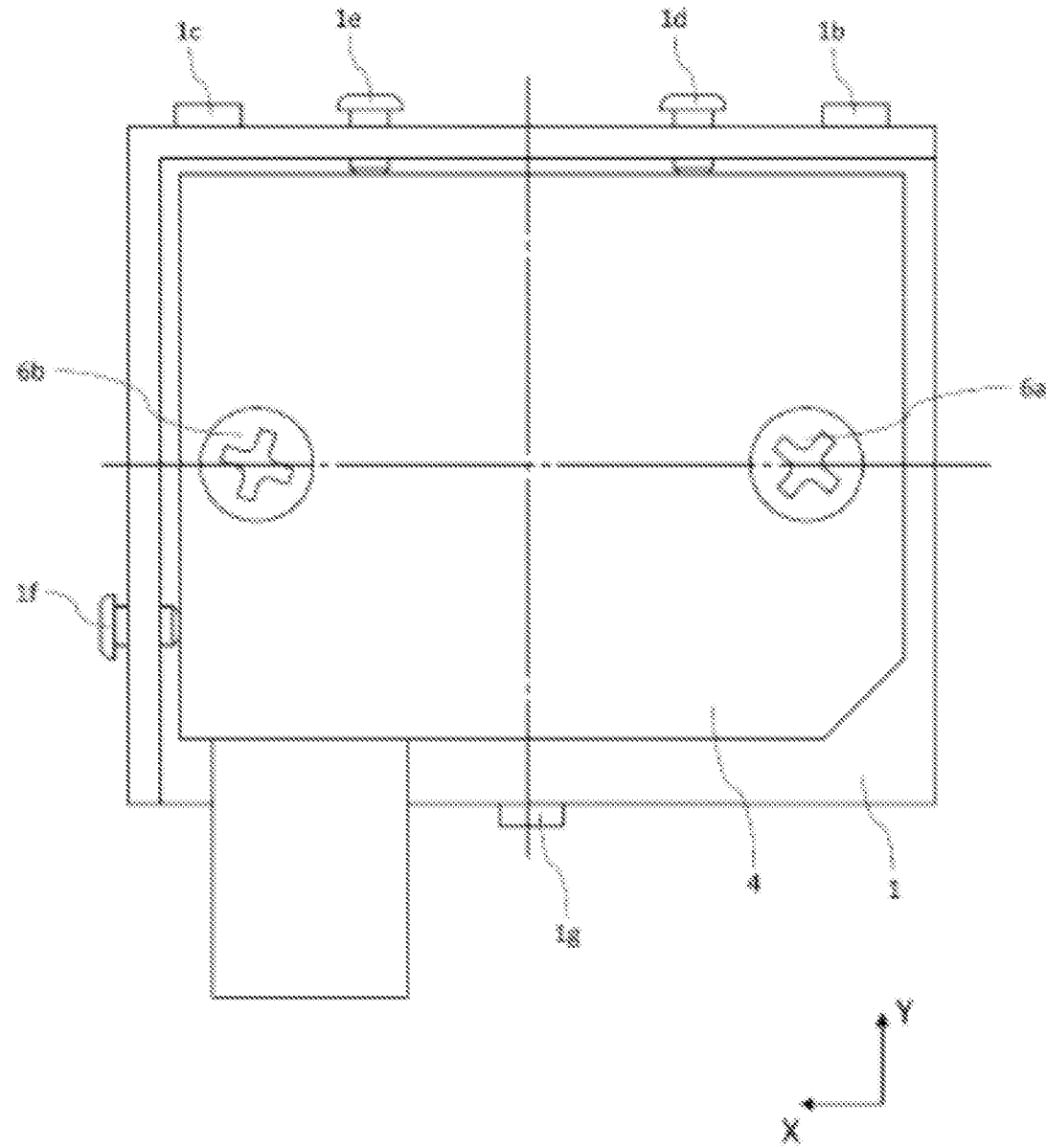

[FIG. 7]
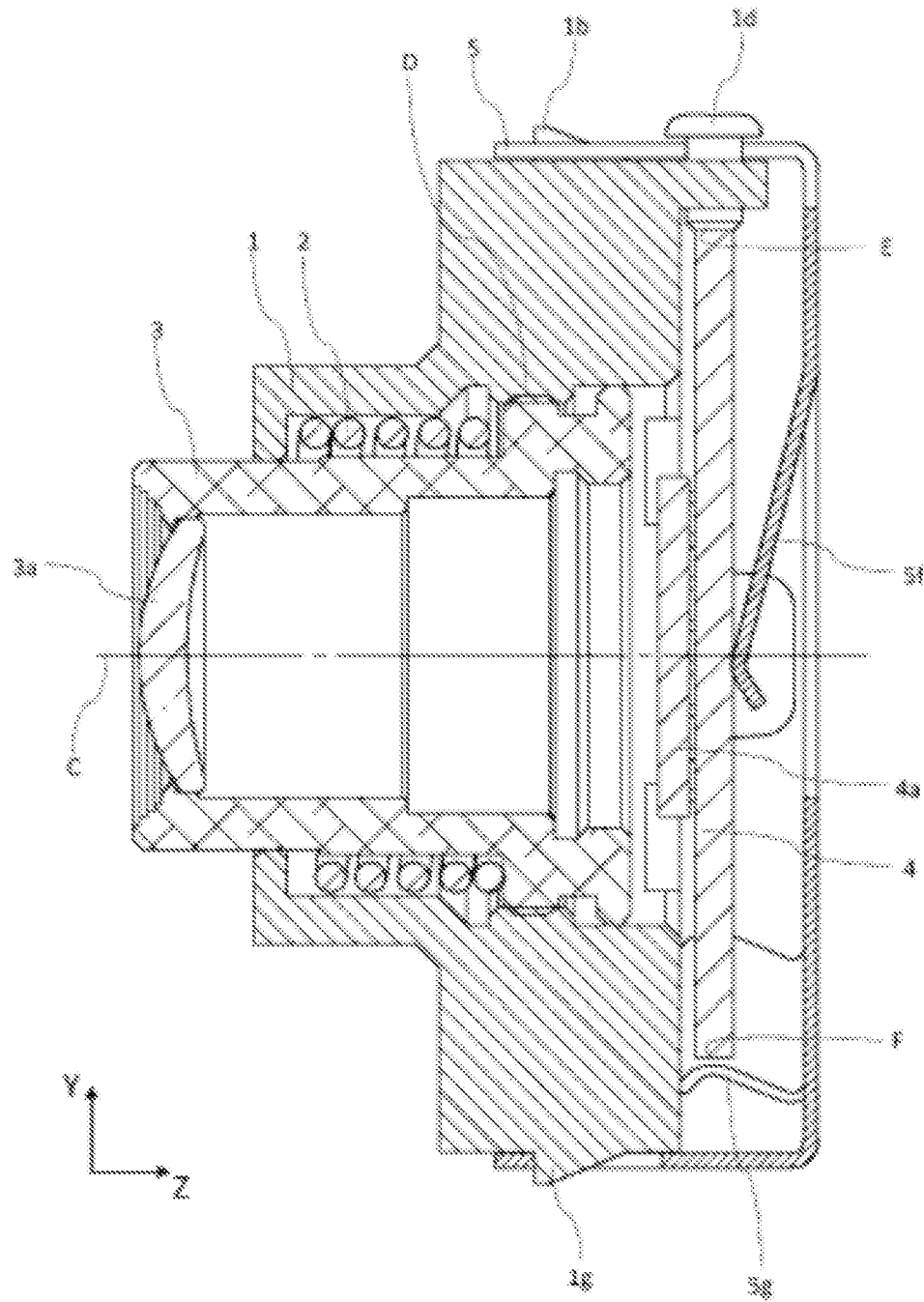

[FIG. 8]
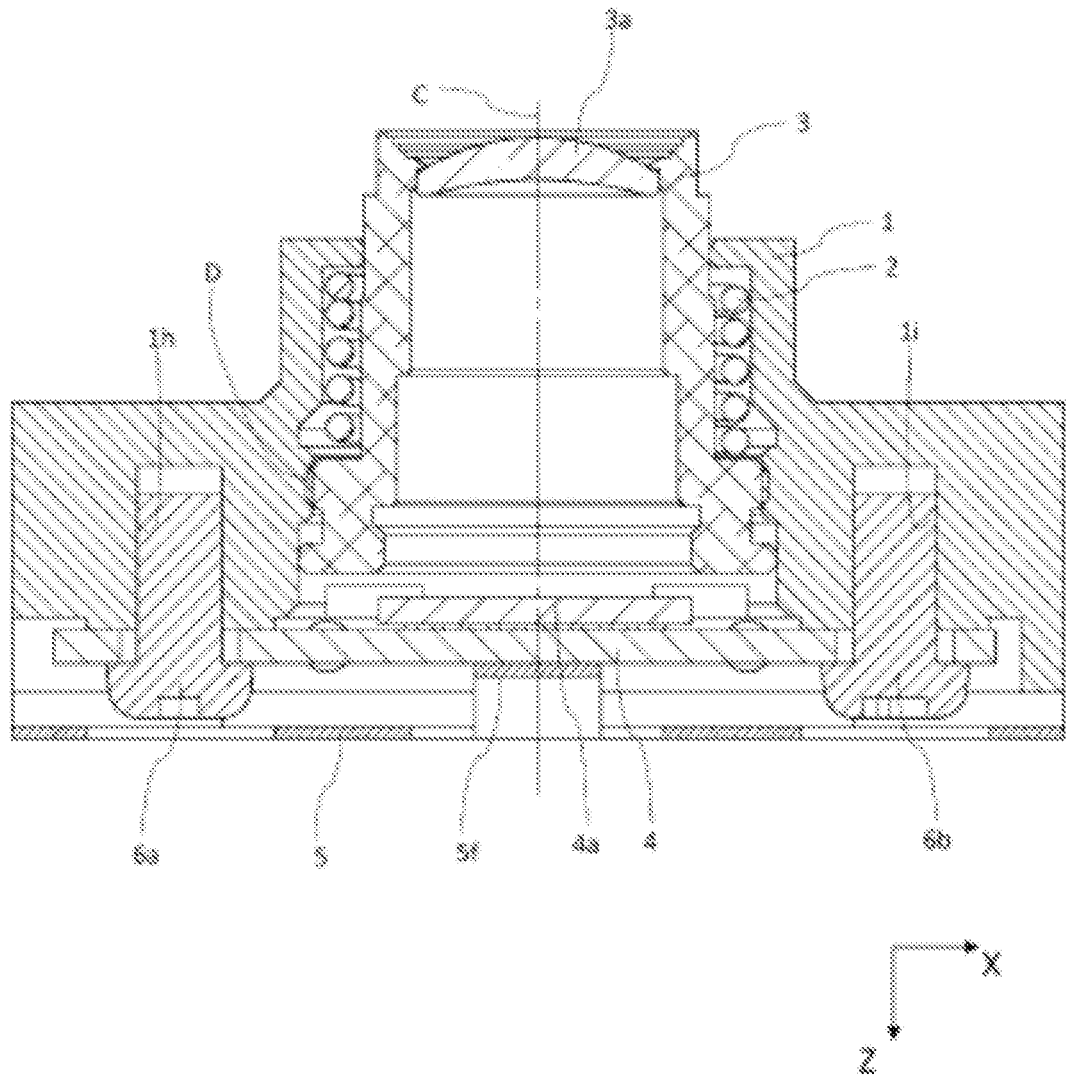

IMAGING DEVICE

CROSS REFERENCE TO RELATED APPLICATIONS

This application is a National Stage on International Application PCT/JP2018/000899, filed Jan. 16, 2018, which published as WO 2018/135453 on Jul. 26, 2018. The International Application claims priority to Japanese Application No. 2017-009480 filed Jan. 23, 2017. All of these applications are incorporated herein by reference.

FIELD OF TECHNOLOGY

One aspect of the present invention relates to an imaging device.

BACKGROUND

With an imaging apparatus at that has a lens barrel and the substrate on which the imaging element is mounted, it is necessary to adjust the position of the lens barrel in relation to the imaging element, and necessary to adjust the optical axis. As the method for adjusting the optical axis, in Japanese Unexamined Patent Application Publication 2012-74934, for example, a structure is used wherein the position of the imaging element is secured, so as to not become misaligned, through fitting together. Moreover, means for positioning and securing a lens and imaging element are disclosed in Japanese Unexamined Patent Application Publication 2012-113185 as well.

However, in recent years there has been the need to adjust the optical axis with even greater precision than in the past, and for structures so as to not produce misalignment, in imaging devices used in automobiles, and the like. However, with the conventional imaging device, described above, high precision adjustment of the optical axis has not been easy.

SUMMARY

The present invention adopts means such as the following in order to solve the problem described above. Note that while in the explanation below, reference symbols from the drawings are written in parentheses for ease in understanding the present invention, the individual structural elements of the present invention are not limited to those that are written, but rather should be interpreted broadly, in a range that could be understood technically by a person skilled in the art.

One means according to the present invention is:
An imaging device, comprising
a substrate for mounting an imaging portion; a lens barrel for holding a lens group; a holder, for holding the lens barrel, connected to the substrate; and a first elastic body for biasing the substrate in a first direction that is perpendicular to the optical axis.

The imaging device of the structure set forth above enables the optical axis to be adjusted with high precision and stability in a direction that is perpendicular to the optical axis.

Preferably the imaging device set forth above further comprises a second elastic body for biasing the substrate in the optical axial forward direction.

The imaging device structured as set forth above enables the optical axis to be adjusted with higher precision and stability because the substrate is held while being biased not only in a direction that is perpendicular to the optical axis, but in the optical axial direction as well.

Preferably the imaging device set forth above comprises a plate that is secured to the holder and that has the first elastic body and the second elastic body.

The imaging device of the structure set forth above enables the optical axis to be adjusted with high precision through a relatively inexpensive and simple structure, because the first elastic body and the second elastic body are formed in a single plate.

In the imaging device set forth above, preferably the plate is metal.

The imaging device structured as set forth above enables use of a structure that easily prevents electromagnetic noise that is produced by the electronic components that are mounted on the substrate from leaking to the outside. Moreover, it can prevent a reduction in image quality of the image that is captured, which could be caused through the incursion of noise into the electronic components.

In the imaging device set forth above, preferably the holder has a hook portion that protrudes to the outside; the plate has a hole portion into which the hook portion is inserted; and the holder and the plate are fitted together through the hook portion and the hole portion.

The imaging device set forth above enables easy assembly of the holder and the plate through hook fitting. Moreover, it enables the holder and the plate to be connected without the use of an adhesive agent, enabling easy reassembly after disassembly following assembly. Furthermore, this is beneficial because the positioning of the plate is more stable in the state wherein a biasing force is applied in the optical axial direction.

Preferably the imaging device set forth above comprises a first position adjusting tool that supports the substrate so as to enable movement in a second direction (the Y axial direction) that is perpendicular to the optical axis; and a second position adjusting tool for supporting the substrate so as to enable movement in a third direction (the X axial direction) that is perpendicular to the optical axis, wherein the first direction, the second direction, and the third direction, are each different directions.

The imaging device of the structure set forth above enables the position of the substrate to be adjusted in a plane comprising the second direction and third direction, and that is perpendicular to the optical axis. Moreover, this enables greater stability of the position of the substrate in the plane that is perpendicular to the optical axis, due to biasing of the substrate in a diagonal direction in the plane that is structured from the second direction and the third direction.

Preferably the imaging device set forth above further comprises a third position adjusting tool for supporting the substrate so as to enable movement in a second direction, wherein the substrate has a first edge (an edge extending in the Y axial direction) and a second edge (and edge extending in the X axial direction) that is essentially perpendicular to the first edge; the first position adjusting tool and the third position adjusting tool contact the first edge (Y axial direction); and the second position adjusting tool contacts the second edge (the X axial direction).

The imaging device of the structure set forth above enables a structure wherein the rotational position of the substrate can be adjusted easily through changing the positions of the first position adjusting tool and the third position adjusting tool, given that they make contact with the first edge at two positions.

BRIEF DESCRIPTIONS OF THE DRAWINGS

FIG. 1 is an external perspective diagram of the imaging device from the optical axial forward direction.

FIG. 2 is an external perspective diagram of the imaging device from the optical axial rearward direction.

FIG. 3 is an assembly perspective diagram of the imaging device from the optical axial forward direction.

FIG. 4 is an assembly perspective diagram of the imaging device from the optical axial rearward direction.

FIG. 5 is a plan view of the imaging device from the optical axial forward direction.

FIG. 6 is a plan view of the imaging device from the optical axial rearward direction.

FIG. 7 is a cross-sectional diagram of the imaging device at the position of A-A in FIG. 5.

FIG. 8 is a cross-sectional diagram of the imaging device at the position of B-B in FIG. 5.

DETAILED DESCRIPTION

In the imaging device according to the present invention, one distinctive feature is the point that the structure is one wherein the substrate on which the imaging element is mounted is held biased in a plurality of directions that are perpendicular to the optical axis by a plate that has a plurality of leaf springs, enabling the adjustment of the optical axial position by position adjusting screws.

An embodiment according to the present invention will be explained, following the structures below. However, the embodiment explained below is no more than an example of the present invention, and must not be interpreted as limiting the technical scope of the present invention. Note that in the various drawings, identical reference symbols are assigned to identical structural elements, and explanations thereof may be omitted.

Examples according to the present invention will be explained in reference to the drawings. FIG. 1 and FIG. 2 are exterior perspective diagrams of an imaging device according to the present embodiment, wherein FIG. 1 is a diagram seen from the optical axial forward direction and FIG. 2 is a diagram seen from the optical axial rearward direction. FIG. 3 and FIG. 4 are assembly perspective diagrams depicting the various features of the imaging device according to the present embodiment wherein FIG. 3 is a diagram seen from the optical axial forward direction and FIG. 4 is a diagram seen from the optical axial rearward direction. FIG. 5 and FIG. 6 are plan views of the imaging device according to the present embodiment, wherein FIG. 5 is a diagram seen from the optical axial forward direction in FIG. 6 is a diagram seen from the optical axial rearward direction. FIG. 7 is a cross-sectional diagram of the imaging device at the position of A-A in FIG. 5. FIG. 8 is a cross-sectional diagram of the imaging device at the position of B-B in FIG. 5.

Note that in this Specification, the position of the center of the lens, that is, the position of the center of the light that is incident into the imaging element, is termed the "optical axis," and is indicated by "C" in the figures. The object that is imaged, positioned on the side of the lens that is opposite from the imaging element, will be termed the "imaging subject." The direction in which the imaging subject is positioned, in respect lens, is termed "optical axial forward direction," or "the imaging subject side." The direction in which the imaging element is positioned, in respect lens, is termed "optical axial rearward direction," or "the imaging element side." Additionally, in each of the figures, the mutually perpendicular X axis, Y axis, and Z axis are indicated. The Z axis is the direction that is parallel to the direction in which the optical axis extends.

As depicted primarily in FIG. 1 through FIG. 4, the imaging device according to the present embodiment is structured from a holder 1, a biasing member 2, a lens barrel 3, a substrate 4, and a plate 5.

<Holder 1>

The holder 1 holds the biasing member 2 and the lens barrel 3. The holder 1 has an opening portion 1a, where the biasing member 2 and the lens barrel 3 are held in the inner peripheral position on the inside, in the radial direction, of the opening portion 1a. The holder 1 has a thread ridge at the position of "D," shown in FIG. 7 and FIG. 8, on the inside, in the radial direction, of the opening portion 1a. This thread ridge screws together with a thread ridge at the position of "D" on the inside, in the radial direction, of the lens barrel 3. The biasing member 2 is disposed between the holder 1 and the lens barrel 3 in the radial direction.

The holder 1 is connected to the substrate 4 through connecting screws 6a and 6b. Specifically, the connecting screws 6a and 6b are each passed through the screw holes 4b and 4c of the substrate 4, from the back in the optical axial direction toward the front, and are inserted into respective screw holes in the holder 1. Note that the holder 1 and the substrate 4 may be connected together through other means instead.

The holder 1 has hook portions 1b, 1c, and 1g that protrude to the outside, and is coupled to the plate 5 through the hook portions 1b, 1c, and 1g. Specifically, the hook portions 1b, 1c, and 1g are inserted and fitted into respective hole portions 5c2, 5d2, and 5e2 of the plate 5. The hook portions 1b, 1c, at 1g contact the optical axial rearward direction end faces of the hole portions 5c2, 5d2, and 5e2, at least, at the optical axial forward direction position. Movement of the plate 5 in the optical axial rearward direction, relative to the holder 1, is constrained thereby. Moreover, as described below, the holder 1 is biased in the optical axial forward direction indirectly by the leaf spring portion 5f of the plate 5, and the holder 1 is connected thereby to the plate 5, while being biased in the optical axial forward direction by the leaf spring portion 5f. Structuring in this way, with the hook portions 1b, 1c, and 1g, inserted into and fitted with the hole portions 5c2, 5d2, and 5e2, makes it possible to connect the holder 1 and the plate 5 together with stability, through the use of less adhesive agent, or without the use of an adhesive agent. In particular, a configuration wherein the holder 1 and the plate 5 are fitted together without the use of an adhesive agent is preferred, due to the ease of reassembly after disassembly following assembly.

Note that the hook portions 1b, 1c, and 1g may contact the hole portions 5c2, 5d2, and 5e2 in directions other than the optical axial direction. If the holder 1 and the plate 5 are coupled together by the hook portions 1b, 1c, and 1g contacting the hole portions 5c2, 5d2, and 5e2 in a plurality of directions, the holder 1 and the plate 5 will be coupled together more securely.

<Position Adjusting Screws 1d, 1e,

The holder 1 has through holes into which respective position adjusting screws 1d, 1e, and 1f are inserted. As depicted in FIG. 6, the position adjusting screws 1d and 1e extend in the Y axial direction to contact the substrate 4 at different positions in the X axial direction in the XY plane. The position adjusting screws 1d and 1e contact an end face of the edge of the substrate 4 that extends in the X axial direction (position "E" in FIG. 7). Additionally, the position adjusting screw 1f extends in the X axial direction to contact the substrate 4 in the XY plane, as depicted in FIG. 6. The position adjusting screw 1f contacts the end face of an edge of the substrate 4 that extends in the Y axial direction.

The position of the holder 1 in the XY plane is adjusted through the position adjusting screws 1d, 1e, and 1f. The specific position adjustments of the substrate 4 in respect to the holder 1 will be described below. The position adjusting screws 1d and 1e are an example of a "first position adjusting tool" and a "third position adjusting tool" of the present invention. The position adjusting screw 1f is an example of a "second position adjusting tool" of the present invention.

<Lens Barrel 3>

The lens barrel 3 is a cylindrical member that extends in the optical axial direction. The lens barrel 3 holds at least one optical member, including a lens 3a.

Optical members held in the lens barrel 3 include, in addition to the lens 3a, lenses, spacers, aperture plates, optical filters, and the like (not shown). The lens that includes the lens 3a is formed from a raw material that has transparency, such as glass, plastic, or the like, and refracts and transmits, in the optical axial rearward direction, the light from the optical axial forward direction. The spacers are disk-shaped members having an appropriate thickness in the optical axial direction, to adjust the positions of the individual lenses in the optical axial direction. The spacers have opening portions in the center portions thereof, including the optical axis. The aperture plate determines the outermost position of the light that passes therethrough. The optical filters suppress or block light of prescribed wavelengths. Optical filters include, for example, infrared radiation cut filters that reduce the infrared radiation that passes therethrough. The number of these optical members can be changed arbitrarily.

The lens barrel 3 has thread ridges at the position of D in FIG. 7 and FIG. 8, which is the outer peripheral position on the outside in the radial direction. The thread ridges fit with thread ridges that are formed on the inside, in the radial direction, of the opening portion 1a of the holder 1. The amount to which the lens barrel 3 is screwed into the holder 1 is adjusted through rotating the lens barrel 3 in respect to the holder 1. As described below, because the substrate 4 on which the imaging element 4a is secured in the optical axial direction in respect to the holder 1, the position of the lens barrel 3 (more precisely, of the lens 3a) in the optical axial direction in respect to the imaging element 4a is adjusted through adjusting the amount by which the lens barrel 3 is screwed into the holder 1. This makes it possible to adjust the focus.

<Biasing Member 2>

The biasing member 2 is, for example, a cylindrical ring spring, or the like, and is disposed between the lens barrel 3 and the holder 1 unit the radial direction. Specifically, the biasing member 2 is disposed on the outside of the lens barrel 3 in the radial direction and on the inside of the holder 1 in the radial direction. The optical axial forward direction end portion of the biasing member contacts the holder 1, and the optical axial rearward direction end portion contacts the lens barrel 3. The biasing member 2 biases the holder 1 and the lens barrel 3 in directions of mutual separation. Through this, the holder 1 and the lens barrel 3 are connected together with stability, even if there is extra space in the screw fit between the holder 1 and the lens barrel 3. Note that the biasing member 2 may be a biasing member such as a leaf spring, or the like, instead of a ring spring.

<Substrate 4>

The substrate 4 is a rigid substrate, and electronic components, including the imaging element 4a, are mounted thereon. The imaging element 4a is a photoelectric converting element for converting the incident light into electric signals, and is, for example, a CMOS sensor, a CCD, or the like, although there is no limitation thereto. Note that the imaging element 4a is an example of an "imaging portion" in the present invention. Moreover, in the imaging device, an imaging portion other than the imaging element 4a, having an imaging function, may be used instead.

As depicted in FIG. 8, the optical axial forward direction surface of the substrate 4 contacts the optical axial rearward direction surface of the holder 1, and are connected together through connecting screws 6a and 6b. As depicted in FIG. 2 and FIG. 7, the substrate 4 contacts the leaf spring portion 5g of the plate 5, and is biased thereby in a direction that is at the diagonal in respect to the X axis and the Y axis. Although the substrate 4 is essentially rectangular, the position that contacts the leaf spring portion 5g is cut away in a diagonal direction in the XY plane, and makes contact with the leaf spring portion 5g. Moreover, as depicted FIG. 7, the substrate 4 is biased, from the optical axial rearward direction toward the front, by the leaf spring portion 5f of the plate 5. The substrate 4 contacts the position adjusting screws 1d through 1f.

<Plate 5>

The plate 5 is formed from plate-shaped metal. The plate 5 is disposed to the rear, in the optical axial direction, of the substrate 4, and is coupled to the holder 1.

Specifically, as depicted in FIG. 3 and FIG. 4, the plate 5 is a plate-shaped member that extends in the XY plane, and has bend portions 5c, 5d, and 5e that extend in the Z axial direction. The bend portions 5c through 5e are each plate-shaped members that extend in the XZ plane, and have respective hole portions 5c2, 5d2, and 5e2. The hook portions 1b, 1c, and 1g of the holder 1 are inserted respectively into the hole portions 5c2, 5d2, and 5e2.

The plate 5 has a leaf spring portion 5f in the vicinity of the center portion, which includes the optical axis. The leaf spring portion 5f, as depicted in FIG. 7, contacts the optical axial rearward direction of the substrate 4. The leaf spring portion 5f biases the substrate 4 from the optical axial rearward direction toward the front. The leaf spring portion 5f is an example of a "second elastic body" of the present invention.

The plate 5 is rectangular in the plan view, and has the leaf spring portion 5g in a corner portion thereof. The leaf spring portion 5g is a plate-shaped part that has an angle of 45° in respect to both the X axis and the Y axis, and contacts the substrate 4. Through this, the substrate 4 is subjected to a biasing force that is essentially identical in both the X axial direction and the Y axial direction. The leaf spring portion 5g is an example of a "first elastic body" of the present invention.

The plate 5 has through holes 5a and 5b of diameters that are greater than those of the connecting screws 6a and 6b. In the assembly process, the connecting screws 6a and 6b are passed through the through holes 5a and 5b from the optical axial rearward direction, and are inserted into the screw holes 4b and 4c of the substrate 4, which are seen visually.

The plate 5 has functions for preventing electromagnetic noise generated by the electronic components of the substrate 4 from leaking to the outside, and for suppressing incursion of noise from the outside. Because of this, the plate 5 is also called a "shield plate." Moreover, in addition to the plate 5, the holder 1 is also made from metal, as this makes it possible to suppress leakage to the outside, in all directions, of electromagnetic noise, and the like, produced by the electronic components on the substrate 4.

<Optical Axis Adjustment and Focal Adjustment>

In the imaging device structured as set forth above, the optical axial adjustment and focal adjustment can be carried out as described below.

The holder 1 and the lens barrel 3 are coupled through screwing together at the position D in FIG. 7 and FIG. 8, and thus the amount to which they are screwed together is changed through rotating the lens barrel 3 in respect to the holder 1, to adjust the holder 1 and the lens barrel 3 in the optical axial direction. On the other hand, the substrate 4 on which the imaging element 4a is installed is stationary in the optical axial direction in respect to the holder 1. Through this, the distance between the lens barrel 3 and the imaging element 4a can be adjusted through rotating the lens barrel 3 in respect to the holder 1, to adjust the focus. In this case, the biasing member 2 is disposed between the holder 1 and the lens barrel 3, so that despite the holder 1 and the lens barrel 3 being screwed together, they will be joined together with stability, without play.

The substrate 4 is held while biased by the plate 5 that is positioned and secured, connected to the holder 1. Specifically, the substrate 4 is biased toward the front, in the optical axial direction, by the leaf spring portion 5f of the plate 5. Moreover, the substrate 4 is biased in a diagonal direction, in the XY plane, perpendicular to the optical axis, by the leaf spring portion 5g of the plate 5. Moreover, the positioning of the substrate 4 in the XY claim is adjusted by the position adjusting screws 1d, 1e, and 1f. When the position of the substrate 4 in the XY plane, in respect to the plate 5, is changed, the relative positioning between the substrate 4 and the lens barrel 3 (and thus the lens 3a) is changed, and thus the optical axial position is adjusted through adjusting the position of the substrate 4 through the position adjusting screws 1d, 1e, and 1f.

More specifically, the position of the substrate 4 in the Y axial direction changes depending on the amount to which the position adjusting screws 1d and 1e are screwed in. On the other hand, the position of the substrate 4 in the X axial direction changes depending on the amount by which the position adjusting screw 1f is screwed in. Moreover, the substrate 4 moves so as to rotate in the XY plane through changing the balance of the amounts by which the position adjusting screws 1d and 1e are screwed in. In this case, the substrate 4 is biased by the leaf spring portion 5g, and thus the optical axial position can be adjusted with stability.

In this way, the imaging device according to the present embodiment enables the optical axis to be adjusted with high precision and stability, because the substrate 4 is biased in a direction that is perpendicular to the optical axis by the leaf spring portion 5g.

Additionally, this enables the optical axis to be adjusted with higher precision and stability because the substrate 4 is biased in the optical axial forward direction by the leaf spring portion 5f.

Additionally, the plate 5 is structured equipped with leaf spring portions 5f and 5g, thus enabling a relatively inexpensive and simple structure that supports the substrate 4 while applying a bias, without requiring the provision of a leaf spring as a separate member.

An example according to the present invention was explained in detail above. The explanation above is no more than an explanation of one form of embodiment, and the scope of the present invention is not limited to this form of embodiment, but rather is interpreted broadly, in a scope that can be understood by one skilled in the art.

While, in the embodiment, the holder 1 and the lens barrel 3 were screwed together, the structure may be one with a cam fitting instead of being screwed together.

The imaging device according to the present invention is particularly useful as an imaging device to mounted in a vehicle, such as an automobile, which requires the optical axis to be adjusted with particularly high precision.

POTENTIAL FOR USE IN INDUSTRY

The present invention can be used suitably for imaging devices, or the like, for vehicle mounting.

I claim:

1. An imaging device, comprising:
   a substrate mounting an imaging portion;
   a lens barrel holding a lens;
   a holder, holding the lens barrel, connected to the substrate;
   a first elastic body biasing the substrate in a first direction that is perpendicular to an optical axis; and
   a plate that is secured to the holder,
   wherein the holder comprises a hook portion that protrudes to an outside;
   wherein the plate has a hole portion into which the hook portion is inserted; and
   wherein the holder and the plate are fitted together through the hook portion and the hole portion.

2. The imaging device as set forth in claim 1, further comprising:
   a second elastic body biasing the substrate in the optical axial forward direction.

3. The imaging device as set forth in claim 2, further comprising:
   wherein the plate comprises the first elastic body and the second elastic body.

4. The imaging device as set forth in claim 3, wherein:
   the plate is metal.

5. The imaging device as set forth in claim 1, further comprising:
   a first position adjusting tool supporting the substrate so as to enable movement in a second direction that is perpendicular to the optical axis; and
   a second position adjusting tool supporting the substrate so as to enable movement in a third direction that is perpendicular to the optical axis,
   wherein the first direction, the second direction, and the third direction, are each different directions.

6. The imaging device as set forth in claim 5, further comprising:
   a third position adjusting tool supporting the substrate so as to enable movement in a second direction, wherein:
   the substrate comprises a first edge, and a second edge that is essentially perpendicular to the first edge;
   the first position adjusting tool and the third position adjusting tool contact the first edge; and
   the second position adjusting tool contacts the second edge.

* * * * *